United States Patent
Wong et al.

(10) Patent No.: US 6,874,677 B2
(45) Date of Patent: Apr. 5, 2005

(54) BONDING PAD OF SUSPENSION CIRCUIT

(75) Inventors: Xm Wong, Dongguan (CN); Rock Tao, Dongguan (CN)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 0 days.

(21) Appl. No.: 10/294,108

(22) Filed: Nov. 13, 2002

(65) Prior Publication Data

US 2003/0058577 A1 Mar. 27, 2003

Related U.S. Application Data

(62) Division of application No. 09/741,684, filed on Dec. 18, 2000.

(30) Foreign Application Priority Data

Aug. 9, 2000 (CN) .............................. PCT/CN00/00227

(51) Int. Cl.[7] .......................... B23K 35/12; G11B 5/60; G11B 21/08

(52) U.S. Cl. .................... 228/245; 228/246; 360/234.5; 360/264.2

(58) Field of Search ............................... 228/245, 246, 228/254, 56.3; 360/234.5, 234.7, 245.4, 245.8, 264.2

(56) References Cited

U.S. PATENT DOCUMENTS

| | | | | |
|---|---|---|---|---|
| 4,761,699 A | * | 8/1988 | Ainslie et al. .......... | 360/234.5 |
| 5,249,092 A | * | 9/1993 | Russell-Smith et al. . | 360/264.2 |
| 5,645,735 A | * | 7/1997 | Bennin et al. ............... | 216/22 |
| 5,680,275 A | * | 10/1997 | Frater et al. ............. | 360/234.5 |
| 5,821,494 A | * | 10/1998 | Albrecht et al. ....... | 219/121.64 |
| 5,949,618 A | * | 9/1999 | Arya et al. ............... | 360/264.2 |
| 6,046,882 A | * | 4/2000 | Pattanaik et al. ............. | 29/878 |
| 6,078,472 A | * | 6/2000 | Mitoh et al. ............. | 360/245.4 |
| 6,268,980 B1 | * | 7/2001 | Shiraishi et al. ......... | 360/234.5 |
| 6,313,972 B1 | * | 11/2001 | Williams et al. ......... | 360/245.3 |
| 6,318,624 B1 | * | 11/2001 | Pattanaik et al. .......... | 228/56.3 |
| 6,396,665 B1 | * | 5/2002 | Asano ...................... | 360/264.2 |
| 6,404,706 B1 | * | 6/2002 | Stovall et al. ........... | 369/13.17 |
| 6,459,549 B1 | * | 10/2002 | Tsuchiya et al. ......... | 360/264.2 |

FOREIGN PATENT DOCUMENTS

| | | | | |
|---|---|---|---|---|
| EP | 0683491 A2 | * | 11/1995 | |
| JP | 63-226999 | | 9/1988 | ............ H05K/9/00 |
| JP | 9-115125 | | 5/1997 | ............ G11B/5/60 |
| JP | 9-282824 | | 10/1997 | ............ G11B/21/21 |

* cited by examiner

*Primary Examiner*—Lynne R. Edmondson
(74) *Attorney, Agent, or Firm*—Kenyon & Kenyon

(57) ABSTRACT

A new type of suspension circuit electrical bonding pad for electrically and mechanically connecting the magnetic recording head is described. The new type of bonding pad will serve as the joint material as well as the joint interface. Thus, there is no need to apply the conductive material in between the bonding pads and the magnetic recording head terminals, consequently reducing the process leading time and simplifying the magnetic recording head assembly process.

6 Claims, 2 Drawing Sheets

BONDING PAD OF SUSPENSION CIRCUIT

RELATED APPLICATION

This application is a Divisional of patent application Ser. No. 09/741,684, filed on Dec. 18, 2000.

FIELD OF THE INVENTION

The present invention generally relates to a circuit bonding pad for a magnetic recording head of a disk drive, and more specifically, to a circuit and suspension assembly for a disk drive magnetic head assembly.

BACKGROUND OF THE INVENTION

Generally, a head assembly has a constitution in which a head slider having a head element is supported by a slider suspension (hereinafter referred to as a suspension). While the head slider is levitated through the suspension at a fixed distance from a surface of a magnetic recording medium, information is reproduced from or recorded on the recording medium such as a magnetic disk.

The disclosures summarized below seem to be relevant to the present invention: Japanese Non-examined Patent Publication No. Sho 63-226999 discloses a flexible shield wire board with a configuration in which an anisotropic conductive sheet is welded onto an insulating substrate having an electrode terminal so that the sheet is electrically connected to the terminal on the insulating substrate side. Japanese Non-examined Patent Publication No. Hei 9-115125 teaches a method in which the head is bonded to the suspension by use of an anisotropic conductive film (sheet).

Moreover, Japanese Non-examined Patent Publication No. Hei 9-282824 of common assignment, which also seems to be relevant to the present invention, proposes a head slider suspension mechanism having a partition pattern for avoiding the contact of plural types of adhesives used for bonding the head slider to the suspension.

The above-described methods achieve their advantages by electrically connecting the head slider to the suspension. However, the method in which the head slider is connected to the ball bonding by using the soldering contact pad has a problem that the suspension is deformed when more pressure than specified is applied to the pad in a ball bonding process. This deformation has as influence on the levitation property of the head slider and thus causes a disadvantageous reduction in a yield. The method in which the conductive resin is applied requires an additional process of applying the conductive resin as well as a process of bonding the head slider to the suspension. This additional process increases a lead time. Moreover, the head assembly is manufactured through many processes as described above and therefore the head element may be damaged by static electricity at the time of handling.

SUMMARY OF THE INVENTION

The present invention is developed to overcome the above problems.

One object of the present invention is to provide a new type of bonding pad.

Another object of the present invention is to provide a disk drive for a computer.

A further object of the present invention is to provide an assembly method for the bonding pad.

In one aspect of the present invention, a bonding pad for electrically bonding a magnetic head terminal comprises a metal pad and a bonding substance as a surface finishing material.

In another aspect of the present invention, a disk drive comprises the bonding pad.

In a further aspect of the present invention, an assembly method for the bonding pad for electrically bonding a magnetic head terminal comprises following steps:

providing a metal pad on an incoming suspension;

planting solder onto said metal pad of said suspension;

potting a slider on said suspension; and making a heat treatment for said suspension so that said solder on said metal pad adheres to a metal pad of said slider, and becomes a solid state.

The new type of bonding pad in accordance with the present invention enables the rapid connection by simple heat treatment.

Furthermore, the new type of bonding pad in accordance with the present invention enables the reuse of the suspension and circuit by removing the connection between the slider and bonding pad with heat treatment.

Other and further objects, features and advantages of the invention will appear more fully in the following description.

BRIEF DESCRIPTION OF THE ACCOMPANYING DRAWINGS

DETAILED DESCRIPTION OF THE PREFERRED EMBODIMENTS

Preferred embodiments of the present invention now will be described with reference to the accompanying drawings.

Figure 1:
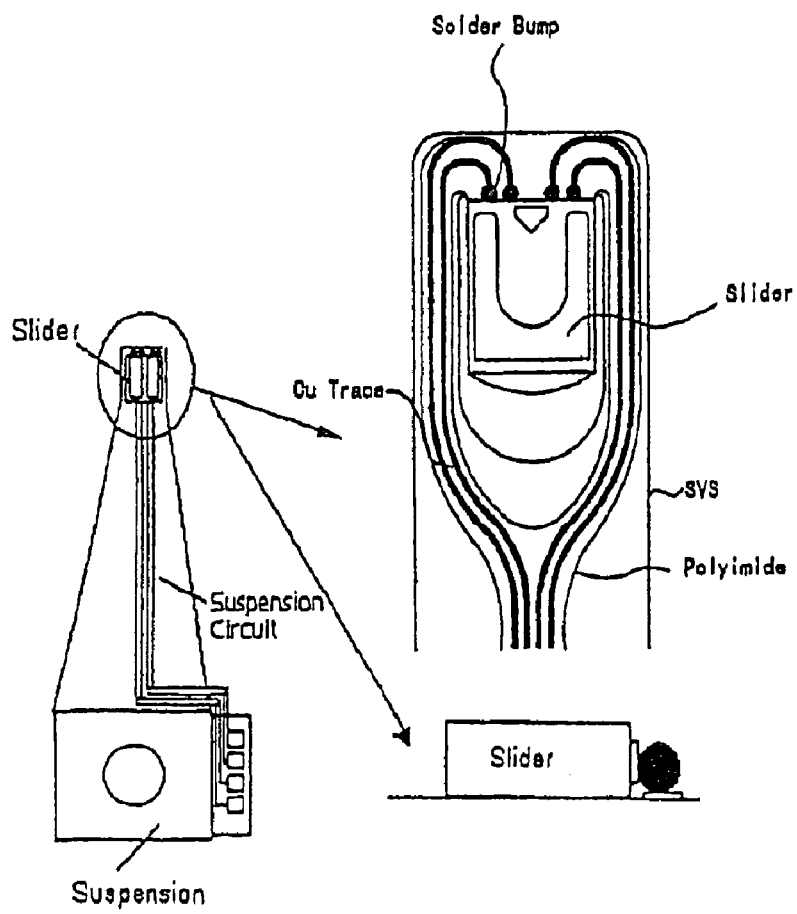
FIG. 1 is a example of a magnetic recording head and suspension circuit.
Figures 2A, 2B:
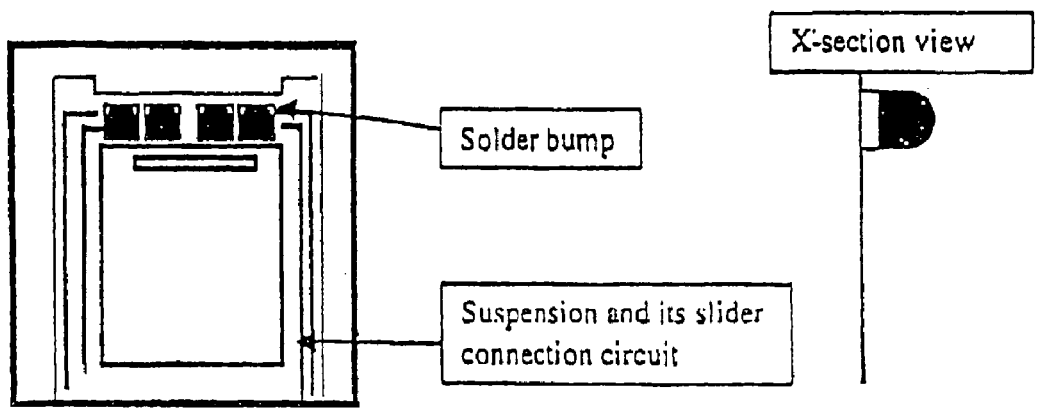
FIG. 2A is a top view of a bonding pad for a suspension circuit in accordance with an embodiment of the present invention.
FIG. 2B is a sectional view of the bonding pad of suspension circuit shown in FIG. 2A.

FIG. 1 is a example of a magnetic recording head and suspension circuit,

FIG. 2A is a top view of the bonding pad of the suspension circuit. As shown in the figure, a suspension is provided on its one end with several bonding bumps for bonding the suspension and its slider connection circuit. The bonding bumps include a conductive metal and a surface finish material, and the surface finish material comprises a material such as solder, conductive polymer, adhesive and film.

FIG. 2B is a sectional view of the bonding pad shown in FIG. 2A. As shown in FIGS. 2A and 2B, the solder bump is cylinder and hemisphere-shaped, and has a height around 50–300 $\mu$m and a diameter less than 180 $\mu$m.

Figure 3:
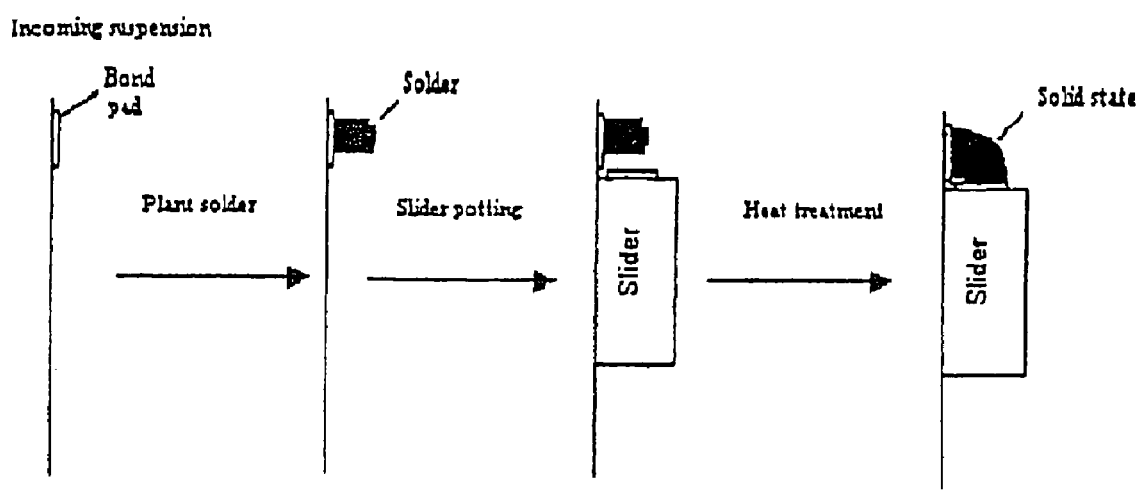
FIG. 3 is a flow chart showing an assembly method of an embodiment of the present invention.

Refer to FIG. 3, which is a flow chart showing an assembly method of the present invention, firstly, a metal pad is provided on a suspension, and then a bonding substance is applied onto the metal pad of the suspension circuit by means of a solder plating or solder paste printing process.

Next, heat treatment is applied to the bonding substance so that it forms a sphere or another desired shape.

Finally, during the heat treatment, connection is completed between the suspension and the slider pad.

While the present invention has been described by way of the preferred embodiments, the foregoing described is in all aspects illustrative, not restrictive. It is obvious to a person skilled in this art that numerous variations and modifications can be devised from the foregoing description without departure from the scope of the invention.

What is claimed is:

1. An assembly method for a bonding pad for electrically bonding a magnetic head terminal comprising:
    providing a first metal pad on an incoming suspension;
    planting a bonding substance onto said first metal pad of said suspension;
    subsequently potting a slider with a second metal pad on said suspension, the second metal pad having no bonding substance on its surface; and
    making a heat treatment for said suspension so that said bonding substance on said first metal pad reflows to the second metal pad, the bonding substance becoming a solid stare.

2. The method of as claimed in claim 1, wherein said bonding substance is solder.

3. The method of claim 1, wherein said bonding substance is a conductive polymer.

4. The method of claim 1, wherein said bonding substance is an adhesive.

5. The method of claim 1, wherein said bonding substance is a film.

6. The method of claim 2, wherein bump height for the solder is approximately 50–300 $\mu$m, and bump diameter for the solder is less than 180 $\mu$m.

* * * * *

UNITED STATES PATENT AND TRADEMARK OFFICE
CERTIFICATE OF CORRECTION

PATENT NO.    : 6,874,677 B2
DATED         : April 5, 2005
INVENTOR(S)   : Xm Wong et al.

It is certified that error appears in the above-identified patent and that said Letters Patent is hereby corrected as shown below:

<u>Column 3,</u>
Line 14, "stare" should be -- state --.

Signed and Sealed this

Twenty-ninth Day of November, 2005

JON W. DUDAS
*Director of the United States Patent and Trademark Office*